United States Patent [19]

Sun et al.

[11] Patent Number: 5,003,422
[45] Date of Patent: Mar. 26, 1991

[54] MAGNETIC HEAD LOCKING MECHANISM

[75] Inventors: Kai C. K. Sun, Saratoga; Rey Chen, Fremont; Edward Lee, San Jose, all of Calif.

[73] Assignee: Microscience International Corp., San Jose, Calif.

[21] Appl. No.: 385,854

[22] Filed: Jul. 26, 1989

Related U.S. Application Data

[63] Continuation-in-part of Ser. No. 226,169, Jul. 29, 1988, abandoned.

[51] Int. Cl.⁵ ................................................. G11B 5/54
[52] U.S. Cl. ...................................... 360/105; 360/106
[58] Field of Search ................................. 360/105–106

[56] References Cited

U.S. PATENT DOCUMENTS

| | | |
|---|---|---|
| 3,308,450 | 3/1967 | Bourdon et al. |
| 4,139,874 | 2/1979 | Shiraishi |
| 4,237,501 | 12/1980 | Barmache et al. |
| 4,371,903 | 2/1983 | Lewis |
| 4,562,500 | 12/1985 | Bygdnes |
| 4,594,627 | 6/1986 | Viskochil et al. |
| 4,635,151 | 1/1987 | Hazebrouck |
| 4,890,176 | 12/1989 | Casey ................................. 360/105 |

Primary Examiner—A. J. Heinz
Attorney, Agent, or Firm—Townsend and Townsend

[57] ABSTRACT

The present invention provides a magnet positioned to attract and hold a portion of a head arm in a disk drive assembly. The magnet is mounted by a resilient mechanism to a support structure so that there is some overtravel when the head arm assembly contacts the magnet, to dampen the impact and prevent the head arm from bouncing away and maintain contact when the disk drive housing receives an external shock. The present invention is preferably implemented with a swing plate which extends downward from the head arm support structure and is mounted at the top portion by a spring-loaded screw. A magnet is mounted on the bottom portion of the swing plate, and interacts with a permeable iron lock pin coupled to the voice coil of the head arm assembly. A pair of locating pins extend through holes in the mid-portion of the swing plate to guide the movement of the swing plate. The swing plate is levered about a short intermediate plate between it and the support structure which extends approximately one-third of the length of the swing plate. The length of this intermediate plate is chosen to give an optimum compromise between the amount of overtravel in the swing plate and the holding force of the swing plate and magnet arrangement. By bending the swing plate, its maget is moved farther from the read/write area of the disk and improved damping is provided, allowing relaxed tolerances.

12 Claims, 2 Drawing Sheets

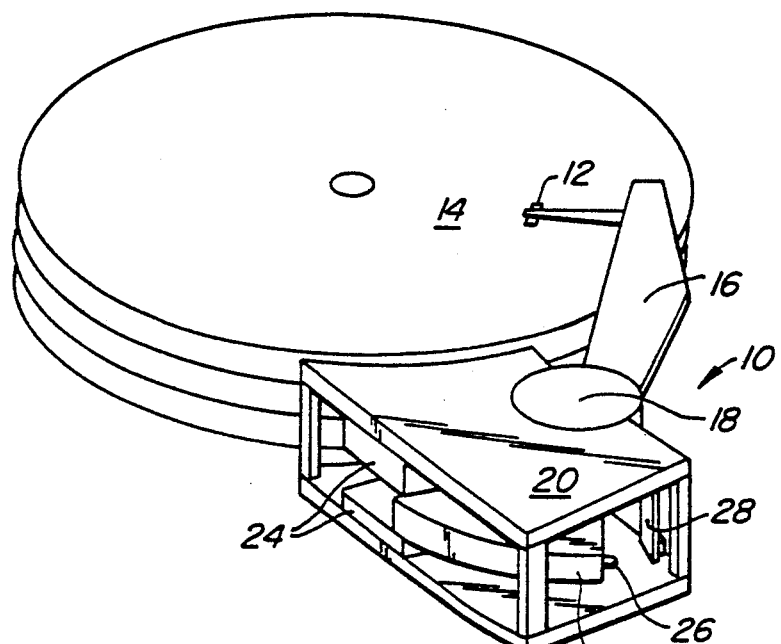
FIG._1.
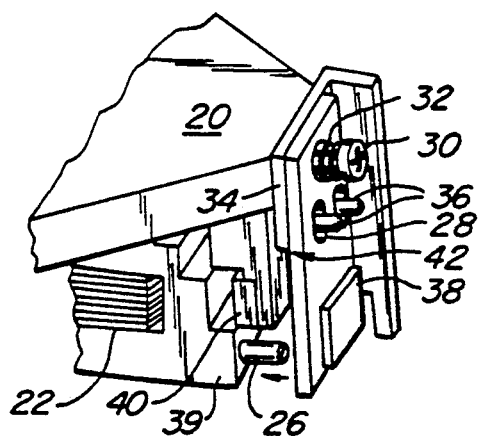
FIG._2.
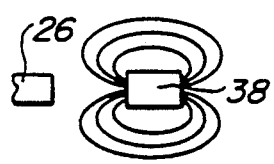
FIG._3A.
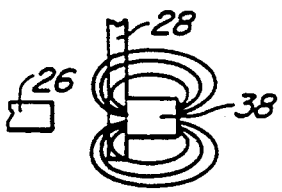
FIG._3B.
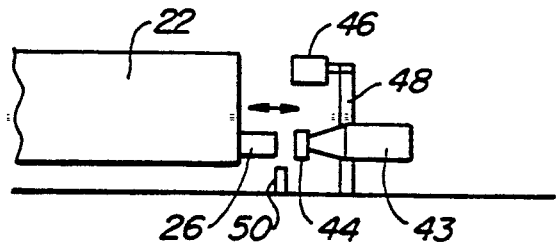
FIG._4.

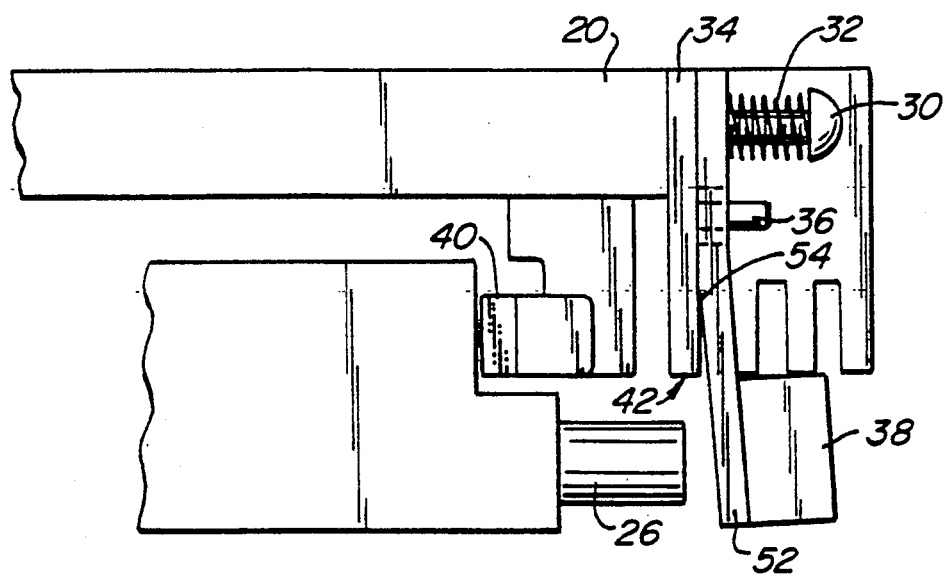
FIG._5.
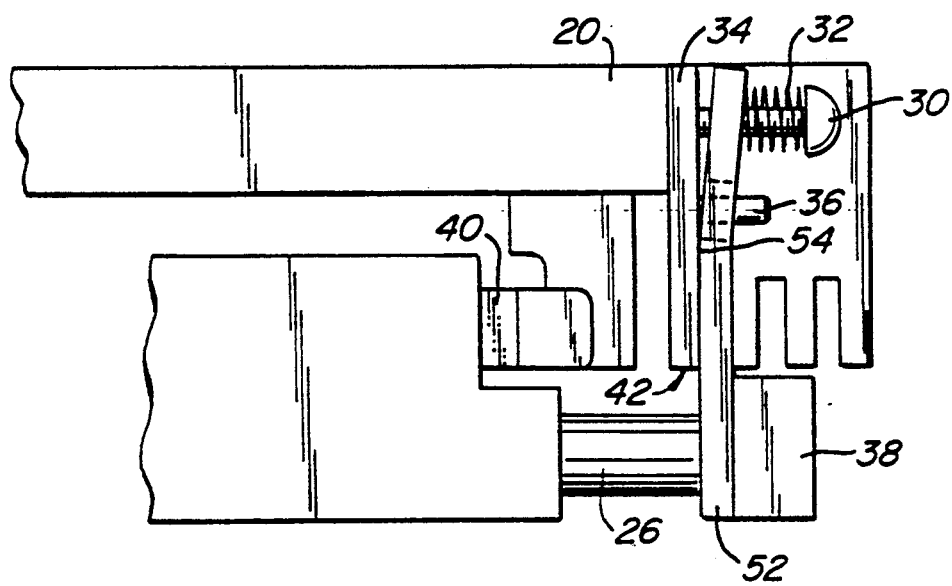
FIG._6.

MAGNETIC HEAD LOCKING MECHANISM

This is a continuation-in-part of application Ser. No. 07/226,169 filed July 29, 1988 and now abandoned.

BACKGROUND

The present invention relates to locking mechanisms for holding a head arm assembly in place when power is off.

Disk drives have a head arm for positioning a head above a disk to read data from the disk and write on to the disk. This head arm is moved with either a rotary or linear actuator. When power is removed, the head arm is moved so that the heads are placed at the edge of the disk or near the center of the disk away from the data in the middle portion of a disk. This is done to prevent the heads from contacting the disk near the data portions and damaging the data. Typically, upon loss of power, a capacitor is discharged or a motor winding is switched to provide the necessary power to move the head arm assembly to its parking position. A limit stop is provided to stop the movement of the head arm assembly, incorporating a shock absorption mechanism to absorb the shock of a fast moving head arm as it engages the limit stops. A solenoid actuated brake or locking mechanism is typically used to hold the head arm in place after it contacts the stop.

However, if the brake or locking mechanism is not engaged, the head arm can move outward and damage the recording surfaces of the heads or the disk. One mechanism which is used in place of a brake or mechanical locking mechanism is a magnet. Such a magnet is shown in U.S. Pat. No. 4,594,627. The magnet is used to hold the head arm assembly in place when it contacts the mechanical stop. As shown in the '627 patent, the magnet is mounted on the bobbin of a linear motor for a linear head arm actuator.

As discussed in U.S. Pat. No. 4,562,500, the purpose of such a magnet prevents the head arm from operating too close to the magnet, for the motion of the head arm can be influenced by the locking magnetic field. This constraint places a limit on the number of data tracks which can be placed on a disk, since data tracks near the stop position can not be accurately read without supplying more power, due to the effect of the magnet stop on the head arm during a read/write operation.

The disadvantages of a magnetic latch are overcome in the '500 patent through the use of a mechanical locking mechanism.

An alternate method to the mechanical latching mechanism is the use of a weaker magnet whose field will not extend as far, and thus will not interfere with the read/write operation. However, the head arm assembly may become separated from the magnet when the disk drive housing receives a large shock.

SUMMARY OF THE INVENTION

The present invention provides a magnet positioned to attract and hold a portion of a head arm in a disk drive assembly. The magnet is mounted by a resilient mechanism to a support structure so that there is some overtravel when the head arm assembly contacts the magnet, to dampen the impact and prevent the head arm from bouncing away.

The present invention is preferably implemented with a swing plate which extends downward from the head arm support structure and is mounted at the top portion by a spring-loaded screw. A magnet is mounted on the bottom portion of the swing plate, and interacts with a permeable iron lock pin coupled to the voice coil of the head arm assembly. A pair of locating pins extend through holes in the mid-portion of the swing plate to guide the movement of the swing plate. The swing plate is levered about a short intermediate plate between it and the support structure which extends approximately one-third of the length of the swing plate. The length of this intermediate plate is chosen to give an optimum compromise between the amount of overtravel in the swing plate and the holding force of the swing plate and magnet arrangement.

The swing plate is a magnetically permeable plate to which the magnet is mounted. This permeable plate flattens out the flux field from the magnet so that the field does not extend too far and interfere with the movement of the head arm during read/write operations. Thus the lock pin can make reliable magnetic locking contact with the permeable plate surface.

In an alternate embodiment, a separate, disk-shaped magnet is used with a cylindrical shaped main magnet to flatten out the flux field.

In another embodiment, the swing plate is preferably bent near its middle. This provides more space for the head arm to operate without being affected by the flux field of the magnet. The bent shape also provides a pivot point near the center of the swing plate. This allows the length of the intermediate plate to be longer and therefore restrain the swing plate from moving its magnet too close to the read/write region of the disk.

Thus, the present invention improves over the prior art in two respects. First, the magnet is resiliently mounted so that it provides an adjustable, rotational damping movement, so that a stronger magnet can be used to hold the head arm assembly, and still reduce the possibility of interference with the head arm assembly during read/write operations. This also allows it to tolerate higher shocks during non-operating conditions. In this way, the head arm assembly can be parked in a zone which will be away from the data storage area. A capture and holding range is thereby established.

Second, by shaping the flux field so that it is close to the magnet, a stronger magnet can be used without having its flux extend far enough to interfere with the movement of the head arm during read/write operations.

For a fuller understanding of the nature and advantages of the invention, reference should be made to the ensuing detailed description taken in conjunction with accompanying drawings.

BRIEF DESCRIPTION OF THE DRAWINGS

FIG. 1 is a perspective view of a disk drive head arm assembly showing the position of the magnetic locking swing plate;

FIG. 2 is a perspective view, partially broken away, of the swing plate of the present invention;

FIGS. 3A and 3B show the shape of the magnetic flux without and with the permeable plate, respectively;

FIG. 4 is a side view of an alternate embodiment of the present invention using a cylindrical and disk shaped magnet;

FIG. 5 is a side view of an embodiment with a bent swing plate, shown in the unlocked position; and FIG. 6 is a side view of the embodiment of FIG. 5 in the locked position.

DETAILED DESCRIPTION OF THE PREFERRED EMBODIMENTS

FIG. 1 shows a head arm assembly 10 which positions a read/write head 12 over a disk 14 in a stack of disks. A head arm 16 rotates about a pivot 18 coupled to a head arm support structure 20. Voice coil 22 moves between magnets 24 to cause movement of head arm 16 about pivot 18. When power is off, voice coil 22 is moved so that a pin 26 comes in contact with a magnet on a swing plate 28 to hold the head arm in position away from the data tracks on disks 14. Swing plate 28 is shown in more detail in FIG. 2.

As shown in FIG. 2, swing plate 28 is mounted to support structure 20 with a screw 30. Swing plate 28 is spring loaded by a spring 32. An intermediate plate 34 magnetically isolates swing plate 28 from support structure 20. A pair of guide pins 36 extend through holes in plate 28 to guide the movement of plate 28. A magnet 38 coupled to the bottom end of swing plate 28 attracts an iron pin 26 affixed on a mounting structure 39 for voice coil 22.

A stop 40 made of an energy absorbing material is coupled to structure 20 to contact voice coil structure 22 essentially simultaneously with pin 26 contacting swing plate 28. This provides additional damping to the movement of swing plate 28.

As can be seen, when pin 26 hits swing plate 28, the bottom portion of swing plate 28 will swing outwards, guided by pins 36. This outward movement causes swing plate 28 to pivot about its top end against the resistance of spring 32.

After an initial contact, voice coil 22 may bounce backwards, but swing plate 28 will follow it and will swing in the opposite direction, pivoting about a bottom edge 42 of plate 34. This pivoting movement allows the swing plate with magnet 38 to stay in contact with pin 26, and thus prevent the voice coil structure from bouncing off of the swing plate and maintain contact when the disk drive housing receives a shock.

Swing plate 28 is made up of magnetically permeable material which serves to flatten the magnetic field from magnet 38. This effect is shown in FIGS. 3A and 3B. FIG. 3A shows the flux lines from magnet 38 without plate 28. FIG. 3B shows how plate 28 flattens the flux on the left side of magnet 38, so that the flux lines do not extend as far towards pin 26 as they would in the configuration of FIG. 3A. Thus, the magnetic field will not interfere with pin 26 until pin 26 is very close to plate 28. This prevents the magnetic lock from interfering with the movement of the head arm assembly during the read/write operations.

The holes through which pins 36 extend are made long enough in the vertical direction so that they do not interfere with the movement of the plate. The pins guide the plate so that it does not move side to side.

FIG. 4 shows an alternate embodiment of the present invention which uses a cylindrical magnet 43 coupled to a disk-shaped magnet 44. Magnet 44 serves to flatten the field from cylindrical magnet 43, thus allowing a stronger magnet to be used without its field extending to interfere with the movement of coil 22 during read/write operations. A resilient stop 46 is included. Magnet 43 is mounted with a spring 48 to allow it to move. A stop 50 prevents disk shaped magnet 44 from being pulled along with coil 22 away from the stop mechanism.

FIGS. 5 and 6 show an alternate embodiment of the present invention in which the swing plate is bent. As can be seen in FIG. 5, a swing plate 52 is provided which is bent about a pivot point 54. This moves the primary pivot from the end 42 of intermediate plate 34 to pivot point 54. This allows intermediate plate 34 to be longer, thus further shielding the pivot assembly from the magnet. In addition, lock magnet 38 is moved further away from pin 26 so that it does not interfere with pin 26 during the normal read/write mode in an extended distance of travel.

Swing plate 52 will still pivot about the top and bottom ends of intermediate plate 34 as described above with respect to FIG. 2, but the intermediate motion will be a pivoting motion around point 54. The use of the bent swing plate leverages this intermediate motion, and allows a weaker spring 32 to be used since that end of swing plate 52 will travel further for a given motion than the embodiment of FIG. 2. This can be seen from FIG. 6 which shows a rest position in which the spring is compressed.

As will be understood by those familiar with the art, the present invention may be embodied in other specific forms without departing from the spirit or essential characteristics thereof. For example, a different resilient mechanism could be used to mount the magnet 38 rather than swing arm 28, such as a leaf spring. In addition, rather than guide pins 36, recesses in the swing plate could be provided to interact with projections in the position of pins 36. Accordingly, the disclosure of the preferred embodiments of the invention is intended to be illustrative, but not limiting, of the scope of the invention which is set forth in the following claims.

What is claimed is:

1. A locking mechanism for magnetically coupling to a magnetically attractive metal portion of a head arm in a disk drive to hold said head arm in place, comprising:
   a magnet positioned to contact said metal portion of said head arm when a head mounted on said head arm is proximate a center portion or a perimeter of a disk in said disk drive; and
   a swing plate having said magnet mounted on a first end and being hingedly coupled at a second end to a support structure, for allowing overtravel movement of said magnet when contacted by said metal portion of said head arm.

2. The locking mechanism of claim 1 wherein said swing plate is coupled to said support structure with a mechanism including a spring.

3. The locking mechanism of claim 1 further comprising a pair of pins extending through slots in said swing plate for guiding movement of said swing plate.

4. The locking mechanism of claim 1 wherein said swing plate is made of a magnetically permeable material.

5. The locking mechanism of claim 1 further comprising an intermediate plate mounted between said swing plate and said support structure.

6. The locking mechanism of claim 5 wherein said intermediate plate is shorter than said swing plate.

7. The locking mechanism of claim 1 wherein said metal portion is a pin having a flat surface proximate said swing plate for providing a maximum contact area with said swing plate.

8. A locking mechanism for magnetically coupling to a metal portion of a head arm in a disk drive to hold said head arm in place, comprising:

a magnet positioned to contact said metal portion of said head arm when a head mounted on said head arm is proximate a center portion or a perimeter of a disk in said disk drive, said magnet including a first, elongate portion having an elongate axis extending the length of said elongate portion pointed toward said metal portion of said head arm and a second, flat portion having a first dimension substantially orthogonal to said elongate axis, said first dimension being larger than a second dimension parallel to said elongate axis, said flat portion being movable to allow overtravel movement of said magnet when contacted by said metal portion of said head arm.

9. The locking mechanism of claim 8 wherein said first and second portions are separable.

10. The locking mechanism of claim 8 wherein said first, elongate portion of said magnet has a cylindrical shape tapered proximate said flat portion and said second, flat portion has a disk shape.

11. A locking mechanism for magnetically coupling to a magnetically attractive metal portion of a movable head arm assembly mounted in a fixed head arm structure to hold said head arm assembly in place when power is removed, comprising:

a swing plate hingedly coupled at a first end to said support structure and positioned to be contacted at a second end by said metal portion of said head arm assembly;

a magnet coupled to said second end of said swing plate on a side of said swing plate opposite said head arm assembly;

an intermediate plate positioned between said support structure and said swing plate to provide a pivot point for said swing plate, said intermediate plate extending less than the distance of the length of said swing plate; and means for biasing said first end of said swing plate towards said support structure.

12. The locking mechanism of claim 11 wherein said swing plate is bent to rotate about a pivot position in contact with said intermediate plate.

* * * * *